3,359,267
PROCESS FOR PREPARATION OF CYANURIC CHLORIDE AND PENTACHLOROPYRIDINE
Robert Neville Haszeldine, "Windyridge," Lyme Road, Disley, England; Ronald Eric Banks, 187 Kingsway, Burnage, Manchester, England; and John Michael Birchall, 22 Lorna Road, Cheadle Hulme, England
No Drawing. Filed Dec. 14, 1965, Ser. No. 513,846
Claims priority, application Great Britain, Mar. 17, 1965, 11,336/65
8 Claims. (Cl. 260—248)

This invention relates to a new process for the preparation of cyanuric chloride and pentachloropyridine. More particularly, this invention embodies a method for producing cyanuric chloride and pentachloropyridine by reacting carbon tetrachloride with ammonia at elevated temperatures. Both pentachloropyridine and cyanuric chloride are well known materials having a variety of industrial and laboratory uses.

According to the process of this invention, cyanuric chloride and pentachloropyridine are prepared by reacting carbon tetrachloride with ammonia at a temperature within the range of 320° C. to about 1000° C., preferably 320° C. to about 700° C. The reaction is carried out by heating a mixture of the two reactants at the aforesaid temperatures, in the absence of a solvent. The molar ratio of the $CCl_4$ to $NH_3$ in the reaction mixture can, in general, range from about 20:1 to about 1:20, although substantially equimolar amounts are preferred. The reaction pressure is not critical and may be from about 1 to about 500 atmospheres, preferably 10 to 200 atmospheres. The reaction is accomplished by heating the reactants for a period of from about one hour to about 8 weeks, preferably from about one day to about 5 weeks, and most preferably from about 5 to 15 days.

In a preferred embodiment of the invention, the aforesaid reaction may be carried out in the presence of an effective amount of hexachlorobutadiene. It has been discovered that reacting a mixture of carbon tetrachloride, ammonia and, additionally, said hexachlorobutadiene, improves the yield of pentachloropyridine. The amount of hexachlorobutadiene employed may be within the range of about 0.1 to 10 moles per mole of carbon tetrachloride.

The above-described reactions may be carried out by batch procedures or continuously. The products are recovered by conventional techniques. For instance, volatile by-products and unreacted carbon tetrachloride (and hexachlorobutadiene, if used) are separated from the product mixture by vacuum distillation, followed by solvent extraction of the solid residue. The pentachloropyridine and cyanuric chloride then may be separated from each other, preferably by solvent extraction, or by preferential chemical reaction. The mixture may, for example, be treated with an amine with which the cyanuric chloride component will react while the pentachloropyridine remains inert. Suitable extractive solvents for separating the two products in the preferred manner, however, include, for example, methanol, ethanol, propanol, t-butanol, methylene dichloride, chloroform, benzene, light petroleum solvent, ethyl acetate, dioxane, tetrahydrofuran, acetone, diethyl ether, ethylene glycol monoethyl ether and the like.

The process of the invention embodied herein is illustrated by the following examples:

EXAMPLE I

Mixtures of carbon tetrachloride (13.51 g., 88.0 mmole) and ammonia (1.54 g., 88.0 mmole) are sealed, in equimolar quantities, into three 300-ml. silica tubes, which are then heated at 450° C. for 4 weeks. The volatile products are transferred to a vacuum distillation unit, where non-condensible and condensible fractions are obtained. The non-condensible gas (0.125 g.) is identified as nitrogen, and the condensible fraction is distilled in vacuo through traps cooled to $-72°$ C., $-140°$ C. and $-196°$ C.

The fraction collected at $-72°$ C. (2.02 g., M, 148) is identified as unreacted carbon tetrachloride (15% recovery), containing a trace of a component which gives an absorption in the infrared at $9.75\mu$.

The fraction collected at $-140°$ C. comprises chlorine (0.07 g. as estimated by reaction of the fraction with excess potassium iodide, followed by a thiosulfate titration) and some unidentified material (0.17 g.; Found, M, 77) which gives absorptions in the infrared at 5.41 (s), 5.95 (m), 7.10 (w), 9.75 (m), 11.80 (s), and 12.59 (s) $\mu$.

The fraction collected at $-196°$ C. is hydrogen chloride (8.45 g., 87%).

The solid product obtained (3.44 g.) is extracted with dry diethyl ether in a Soxhlet apparatus for 3 hours. The ethereal solution is evaporated to give a pale yellow lachrymatory solid (2.2 g., M.P. 115–117° C.). Infrared spectroscopic analysis reveals the presence in this product of pentachloropyridine and cyanuric chloride. The ether-soluble solid is analyzed by mass spectroscopy and found, by direct comparison of the spectrum obtained with those of standard samples, to be a mixture of pentachloropyridine (ca. 27%), cyanuric chloride (ca. 70%), hexachlorobenzene (ca. 2%) and two other components (each ca. 0.5%), one of which appears to be pentachlorocyanobenzene.

EXAMPLE II

An equimolar mixture of carbon tetrachloride (2.37 g.), ammonia (0.26 g.) and hexachlorobutadiene (3.33 g.) is sealed in a 300-ml. silica ampoule in the absence of air and heated at 450° C. for 7 days. The solid product is extracted with diethyl ether; the insoluble material is shown by infrared spectroscopy and melting point determination to be hexachlorobenzene (0.34 g.). The ethereal extract is evaporated to yield a solid (1.81 g.) which is shown by infrared spectroscopy to be a mixture of cyanuric chloride and pentachloropyridine. Stream distillation of this mixture, followed by ether extraction of the distillate and recovery of the extract from the ether phase yields 0.89 of pentachloropyridine.

EXAMPLE III

An equimolar mixture of carbon tetrachloride (3.25 g.) and ammonia (0.36 g.) is heated in a 300-ml. silica ampoule at 450° C. for 7 days. The solid product is worked up as described in Example II to yield 0.44 g. of spectroscopically-pure pentachloropyridine.

It is to be understood that the foregoing illustrative examples are not to be taken as limitative of the scope of the present invention as defined by the appended claims.

We claim:
1. A method for preparing cyanuric chloride and pentachloropyridine which comprises reacting carbon tetrachloride and ammonia at a temperature within the range of 320° C. to about 1000° C.
2. The method of claim 1 wherein the temperature is within the range of 320° C. to about 700° C.
3. The method of claim 1 wherein the molar ratio of carbon tetrachloride to ammonia is from about 20:1 to about 1:20.

4. The method of claim 1 wherein the ratio of carbon tetrachloride to ammonia is substantially equilmolar.

5. The method of claim 1 wherein the reaction is carried out in the presence of hexachlorobutadiene.

6. The method of claim 5 wherein the temperature is within the range of 320° C. to about 700° C.

7. The method of claim 5 wherein the molar ratio of carbon tetrachloride to ammonia is from about 20:1 to about 1:20.

8. The method of claim 7 wherein the molar ratio of hexachlorobutadiene to carbon tetrachloride is from about 0.1:1 to 10:1.

References Cited

UNITED STATES PATENTS

| | | | |
|---|---|---|---|
| 2,607,738 | 8/1952 | Hardy | 260—248 XR |
| 2,692,880 | 10/1954 | Cofrancesco | 260—248 |
| 3,186,994 | 6/1965 | Johnston | 260—290 |

OTHER REFERENCES

Cubicciotti et al. J. Amer. Chem. Soc., vol. 70, pp. 3509–10 (1948).

JOHN D. RANDOLPH, *Primary Examiner.*

JOHN M. FORD, *Assistant Examiner.*